(12) United States Patent
Olsen

(10) Patent No.: US 12,478,535 B2
(45) Date of Patent: Nov. 25, 2025

(54) TRANSPORTABLE AUTONOMOUS DENTAL UNIT

(71) Applicant: Cesar Augusto Olsen, Palhoça (BR)

(72) Inventor: Cesar Augusto Olsen, Palhoça (BR)

( * ) Notice: Subject to any disclaimer, the term of this patent is extended or adjusted under 35 U.S.C. 154(b) by 367 days.

(21) Appl. No.: 18/086,017

(22) Filed: Dec. 21, 2022

(65) Prior Publication Data

US 2024/0207123 A1    Jun. 27, 2024

(51) Int. Cl.
*A61G 15/16* (2006.01)
*A47C 1/00* (2006.01)
*A61C 17/14* (2006.01)
*A61C 19/00* (2006.01)
*A61G 15/12* (2006.01)

(52) U.S. Cl.
CPC .............. *A61G 15/16* (2013.01); *A47C 1/00* (2013.01); *A61C 17/14* (2013.01); *A61C 19/00* (2013.01); *A61G 15/12* (2013.01); *A61G 15/125* (2013.01)

(58) Field of Classification Search
CPC ...... A61G 15/16; A61G 15/12; A61G 15/123; A47C 1/00; A47C 17/14; A47C 19/00
USPC .............. 297/217.1, 411.31, 188.01; 433/33
See application file for complete search history.

(56) References Cited

U.S. PATENT DOCUMENTS

| | | | |
|---|---|---|---|
| 3,986,263 A * | 10/1976 | Borgelt | A61G 15/16 433/33 |
| 4,334,710 A | 6/1982 | Milner, Jr. | |
| 4,367,894 A | 1/1983 | Manuel | |
| 4,527,976 A * | 7/1985 | Behringer | A61G 15/10 297/344.17 |
| 5,211,558 A | 5/1993 | Bailey et al. | |
| 5,601,331 A * | 2/1997 | Austin, Jr. | A61G 15/16 433/79 |
| 6,352,309 B1* | 3/2002 | Beroth | B64D 11/064 297/284.11 |
| 6,406,294 B1* | 6/2002 | Bell | A61G 15/14 433/80 |
| 11,730,655 B2* | 8/2023 | Ahearn | A61G 15/02 433/33 |
| 2011/0195374 A1* | 8/2011 | Boren | A61G 15/002 433/33 |
| 2017/0319416 A1* | 11/2017 | Bailey | A61G 15/125 |
| 2022/0079829 A1* | 3/2022 | Siuda | A61G 15/12 |
| 2024/0115452 A1* | 4/2024 | Birchler | A61G 15/10 |

FOREIGN PATENT DOCUMENTS

| | | | | |
|---|---|---|---|---|
| BR | 7400683 U | * | 11/1995 | |
| BR | MU7400683 U | | 11/1995 | |
| BR | MU7402506 U | | 4/1997 | |
| BR | MU8400657 U | | 11/2005 | |
| BR | MU9100995 U2 | | 5/2014 | |
| JP | 3794978 B2 | * | 7/2006 | ......... A61B 1/00048 |

* cited by examiner

*Primary Examiner* — Jose V Chen
(74) *Attorney, Agent, or Firm* — Piloff Passino & Cosenza LLP; Rachel K. Pilloff; Sean A. Passino

(57) ABSTRACT

A transportable autonomous dental unit is described, mounted on a base to which side walls are associated in order to create a container of around 4 liters of volume, featuring a dental chair whose column has a compressed air tank, a complete instrument table, a compressor to fill the needs of the pneumatic peripherals and venturi suction device for compressed air, means for connection to a water supply line, a wastewater drainage duct, and a power source, offering the same operation conditions of a complete conventional dental unit.

13 Claims, 16 Drawing Sheets

TRANSPORTABLE AUTONOMOUS DENTAL UNIT

FIELD OF INVENTION

The present invention patent describes a transportable autonomous dental unit that includes a dental chair fixed on its base to a transportation container that, additionally, supports the operating structure, allowing disassembly of the dental chair and the dental stool in order to be stored in the container.

BACKGROUND OF THE INVENTION

The fundamental dental equipment in a dentist's office include the chair for patient positioning that can be semi-automatic or automatic, reflectors that assist on viewing the operational field, table with terminals for coupling of hand pieces, reflector, chair for the professional, and water supply lines, compressed air lines, and a power supply.

Usually this equipment is installed in offices, with the structures coupled to preexisting infrastructure to supply energy, water, and compressed air.

Dental chairs, which are important for adequate and safe execution of the procedures, have a fixed base, and are usually semiautomatic or automatic, moved by a pedal.

The state of the art describes transportable dental units, usually used in remote areas of difficult access or conflict areas. Usually these dental units do not have the dental chair, or are deprived of compressors or other elements that ensure autonomy, requiring associated peripheral structures. However, the dental procedure performed without the adequate chair for the patient increases the complexity of the operation, the positioning of the professional, the view of the surgical field, and the manipulation of the patient. Also, any other type of furnishing used in an improvised way does not ensure the stability of the patient and the adequate maintenance of the head position, a necessary condition in dental procedures.

Document MU7402506-6 describes a transportable dental unit that comprises a metallic structure that has wheels on which a motor unit is installed, and a pressure switch to support the suction unit and reflector.

Document MU8400657 describes transportable dental equipment with hydraulic-sanitary structure, featuring a compressor, a compressed air cylinder, a suction device, a tray for tools and/or material, a water tank, and a set of tool holders.

Document U.S. Pat. No. 5,211,558 describes a portable dental structure that includes a structure with casters with means for enclosure and protection of components, but without the chair for the patient as well as the chair for the professional.

With regard specifically to dental chairs, the state of the art describes portable articulated chairs, as described in documents U.S. Pat. Nos. 4,367,894, 4,334,710, and BR9100995U.

However, a transportable dental unit compacted in a container is not described, including a dental chair with means of articulation on the backrest, acetabulum lines, leg rest and headrest; including essential peripherals (suction system, LED reflector, instrument table with coupling terminals for refrigerated rotary handpieces, piezoelectric ultrasound with light, dental curing light, and water heating system), and a hydraulic and compressed air structure that ensures autonomy through the connection to a power source, allowing it to be transported to remote places easily and without offering risks of damage to its components.

Document BR7400683U, from the same holder, describes a portable dental unit that includes a patient chair and a chair for the professional, which can be folded in order to be compacted in a container, with a compressed air tank placed below the dental chair, which is exposed to risk of impact and damage.

In order to provide a unit in a single body, with integration of all the necessary equipment for safe dental procedures, the object of the present patent of invention is an autonomous dental unit mounted on a base with means for coupling of side walls that create a container where the operating structure of a disassembled dental installation is arranged, facilitating transportation and avoiding damage.

SUMMARY

The objective of the present invention is a transportable autonomous dental unit that associates the necessary equipment to ensure dental treatment without technical restriction, including a complete instrument table with a tray and wide possibility of movement, a water unit with a spittoon that is movable vertically and horizontally, besides a dental reflector.

The objective of the present invention is an autonomous dental unit mounted on a base to which side walls are associated to create a container with around 4 liters of volume.

The objective of the present invention is an autonomous dental unit that provides the association of designed equipment for combined use, without the risk of coupling peripherals that can impact the safety requirements.

The objective of the present invention is an autonomous dental unit that has an integrated tool drawer on its base, being able to accommodate a wide range of peripherals that assist in assembling and disassembling the equipment.

The objective of the present invention is an autonomous dental unit that has a compressed air tank placed in the column of the dental chair, avoiding damage and providing mechanical optimization to the structural set.

The objective of the present invention is an autonomous dental unit that has a compressor to supply all the needs for compressed air of the pneumatic peripherals and venturi suction device, not requiring pneumatic installation.

The objective of the present invention is an autonomous dental unit with means for coupling of a water supply line, a wastewater duct, and a source of power.

The objective of the present invention is an autonomous dental unit that offers the same operation conditions of a complete conventional dental set.

The objective of the present invention is an autonomous dental unit that features a reducer motor for the movement of the backrest.

DETAILED DESCRIPTION OF THE INVENTION

Figure 1A:
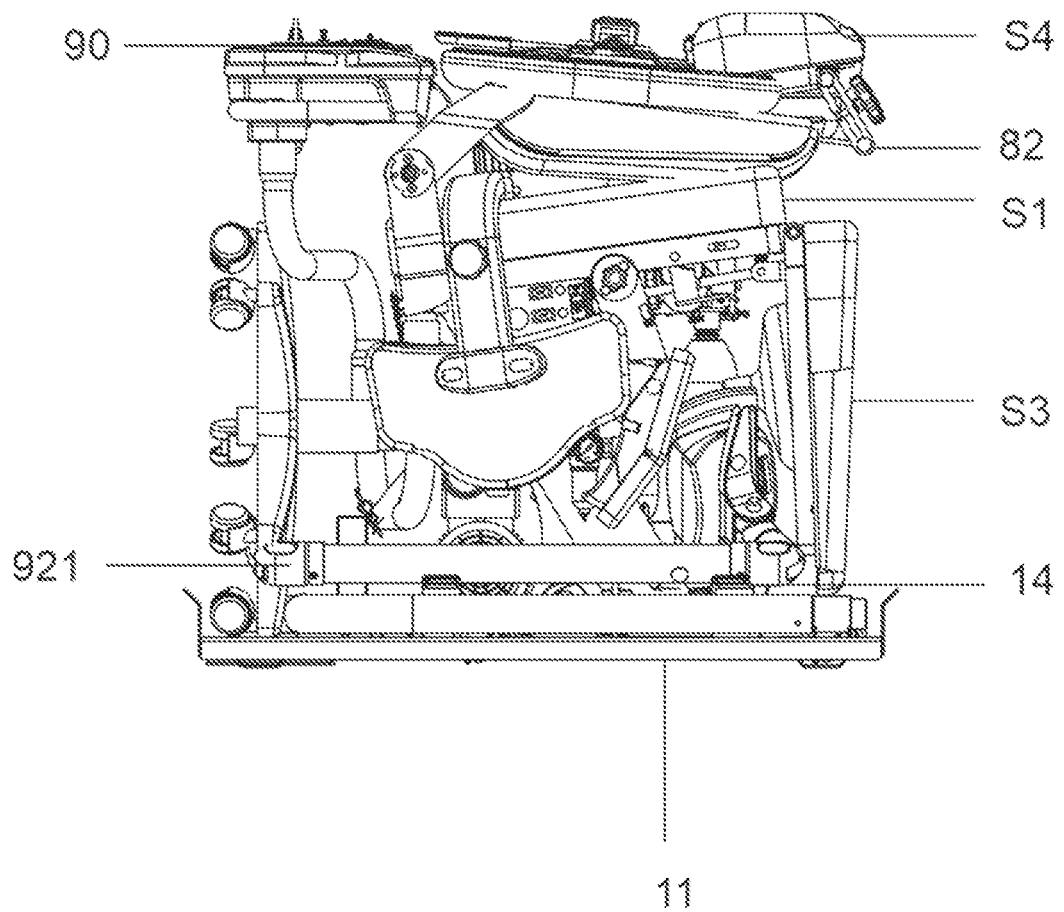
FIG. 1A shows the dental unit operating structure folded/disassembled.
Figure 1B:
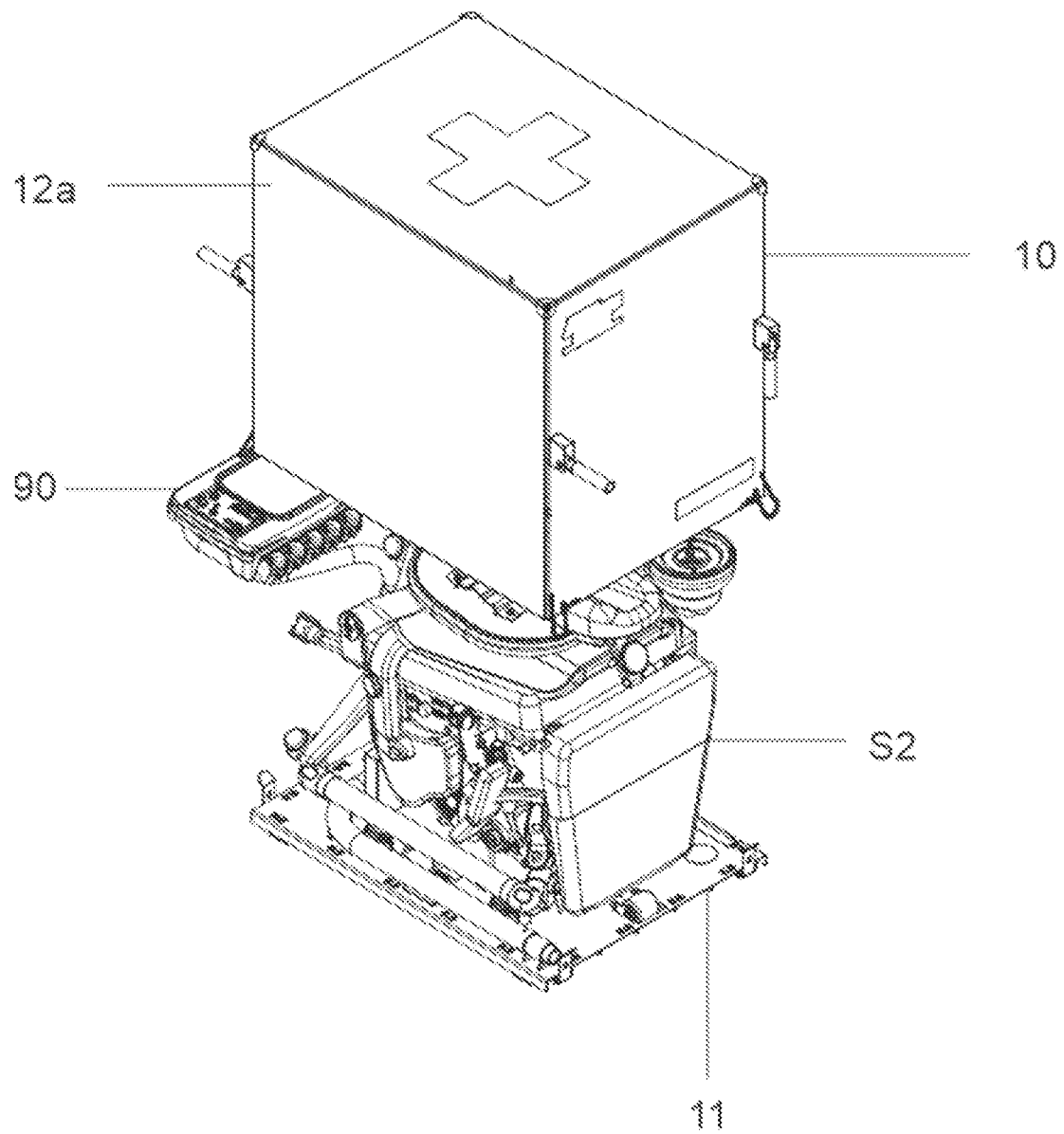
FIG. 1B shows a representation of the folded operating structure ready to be placed in a container.

The transportable autonomous dental unit, object of the present invention, comprises an operating structure that is adequate for dental procedures transported by a container, as shown is FIG. 1.

In order to transport the dental unit, there is a prismatic container (10) that has a base (11) with girders (111) to support and to be moved by specific equipment.

Figure 2A:
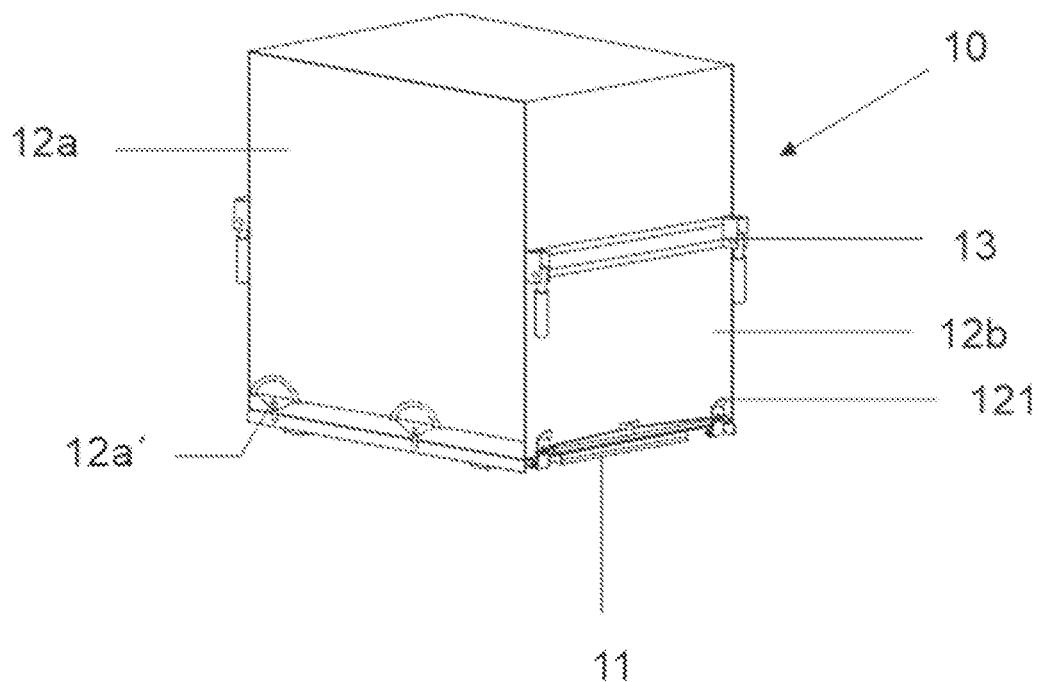
FIG. 2A shows a perspective view of the container that accommodates the dental unit.
Figure 2B:
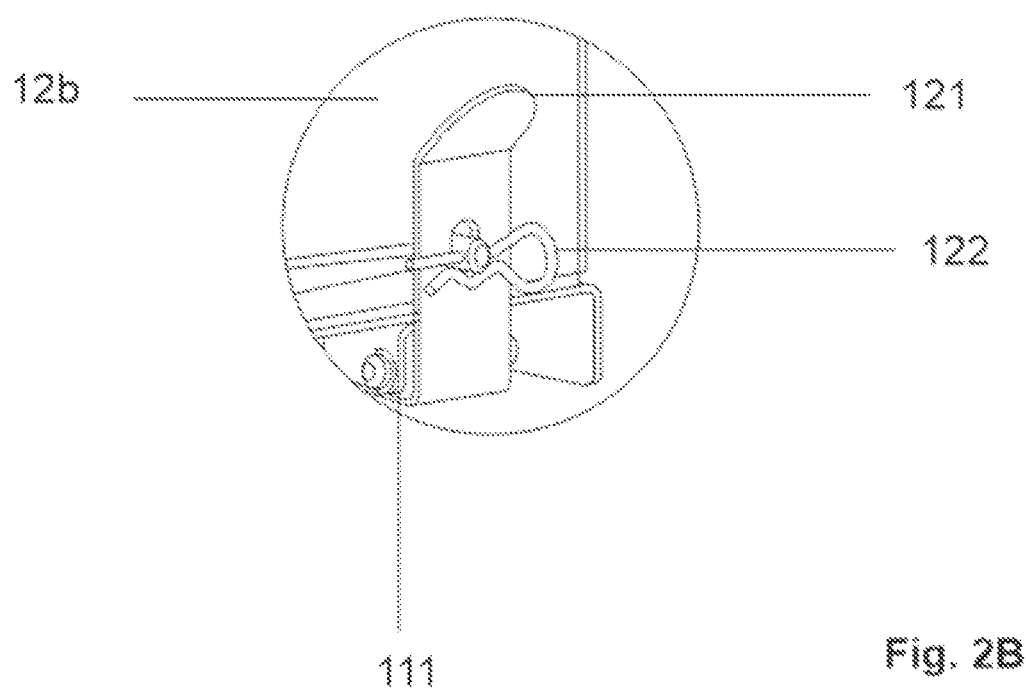
FIG. 2B shows and amplified view of the closing of the container by a flap.
Figure 2C:
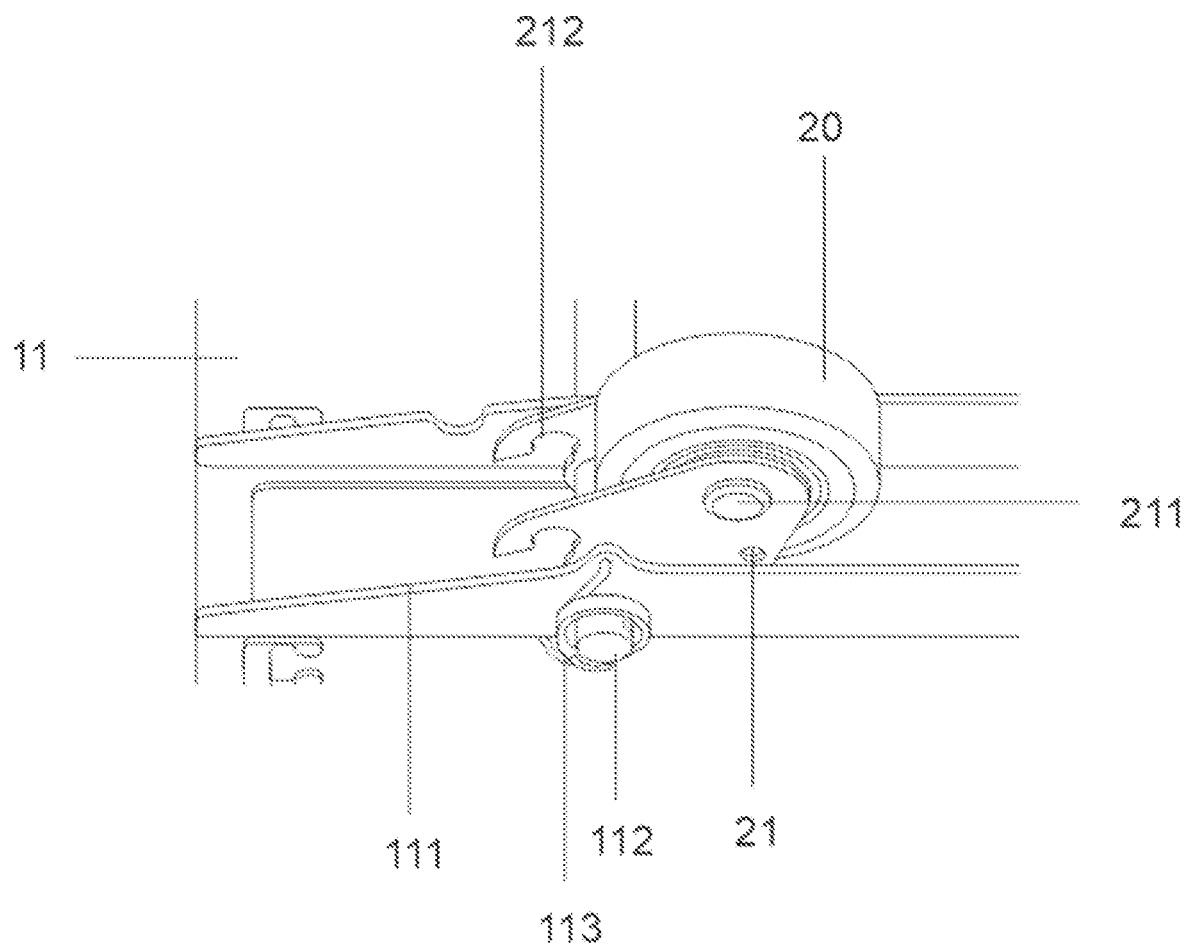
FIG. 2C shows the representation of the caster fixed on the base of the container.

The container (10) has two side faces arranged in opposition (12a) that can be fitted to the base (11) and two other side faces (12b) that have an articulated flap (121) fixed to the girder (111) of the base (11), said flap (121) is provided with a through hole that engages in a pin arranged on the surface of said side face (12b) with clamp locking (122), as detailed in FIG. 2B, creating fast couplings.

For the mobility of the container, casters are arranged (20) fixed to the base (11) of the container (10) by a support (201) that is fixed to a shaft (112) that extends between the sides of the base (11), said support (21) arranged in the gap of the girders (111) and having a shaft (211) to fix the caster (20) and in the opposite end, an indentation (212) of diameter equivalent to the shaft (112).

On the end of the shaft (112) a spring (113) is installed, which, once the shaft is rotated (112) by a tool inserted in the recess (12a'), it is extended, moving the support (21) until the indentation (212) engages the shaft (112). This way, the caster (20) is positioned away from the base (11), allowing the movement of the container (10). In situations in which the use of casters (20) is not necessary, by means of a movement contrary to the shaft (112), the indentation (212) is uncoupled from the coupling in said shaft (112) and the spring (113) returns the caster (20) to the initial position, juxtaposed to the base (11).

The container (10) has handles on its external surface (13).

Figure 4A:
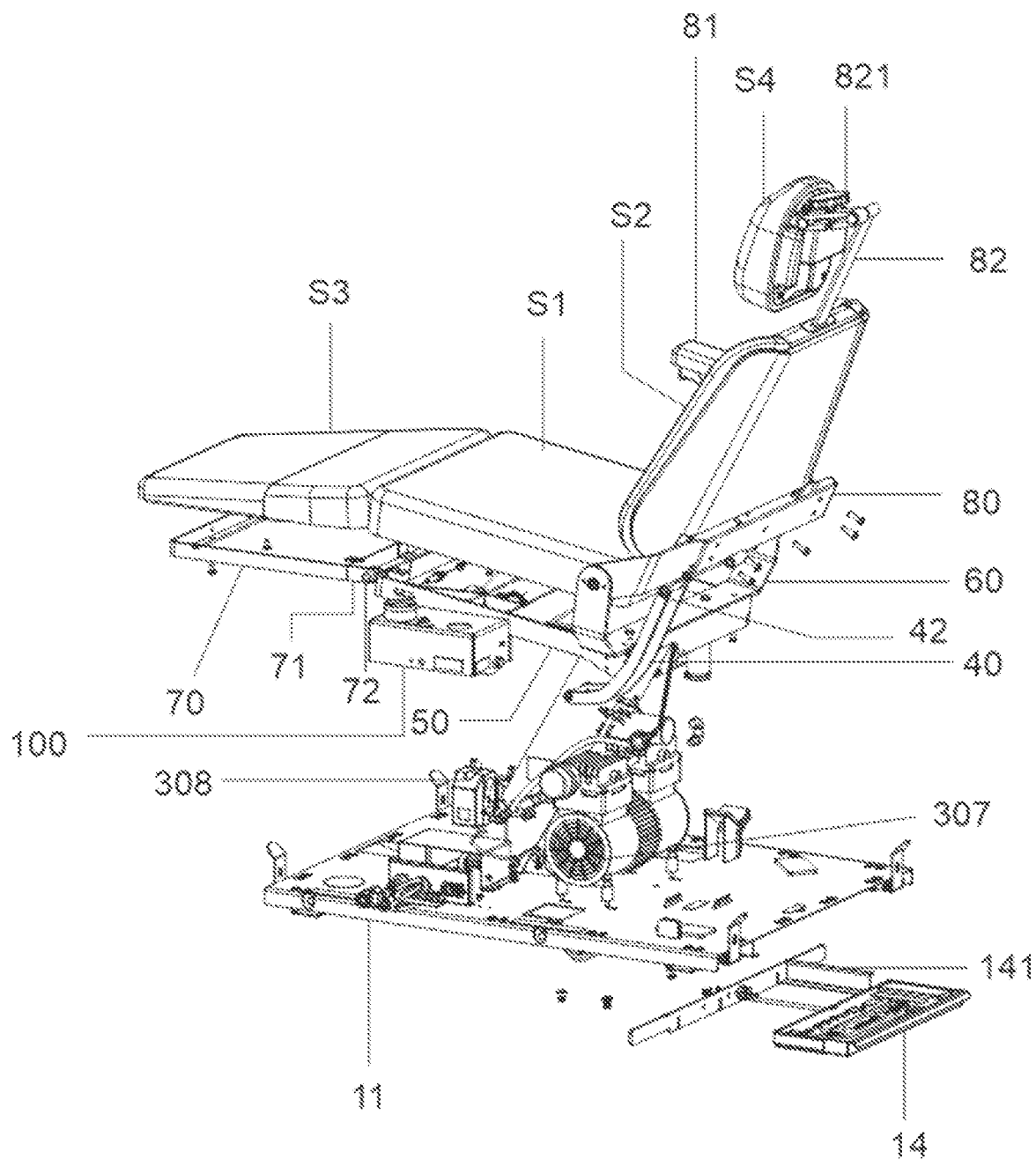
FIG. 4A shows the perspective view of the mounted dental chair and FIG. 4B shows the side view.

As detailed in FIG. 4A, on the base (11) of the container (10) there is a drawer (14) installed that moves on linear guides fixed to the lower face of said base (11). The drawer (14) stores the necessary tools to assemble the unit.

On the base (11) of the container (10) there is a terminal (15) that has connections for the water inlet duct (151), for the wastewater duct (152), and for connecting a power source (153), allowing the coupling of the dental unit to the electrical, water, and sewage infrastructure of the installation site.

Figure 3A:
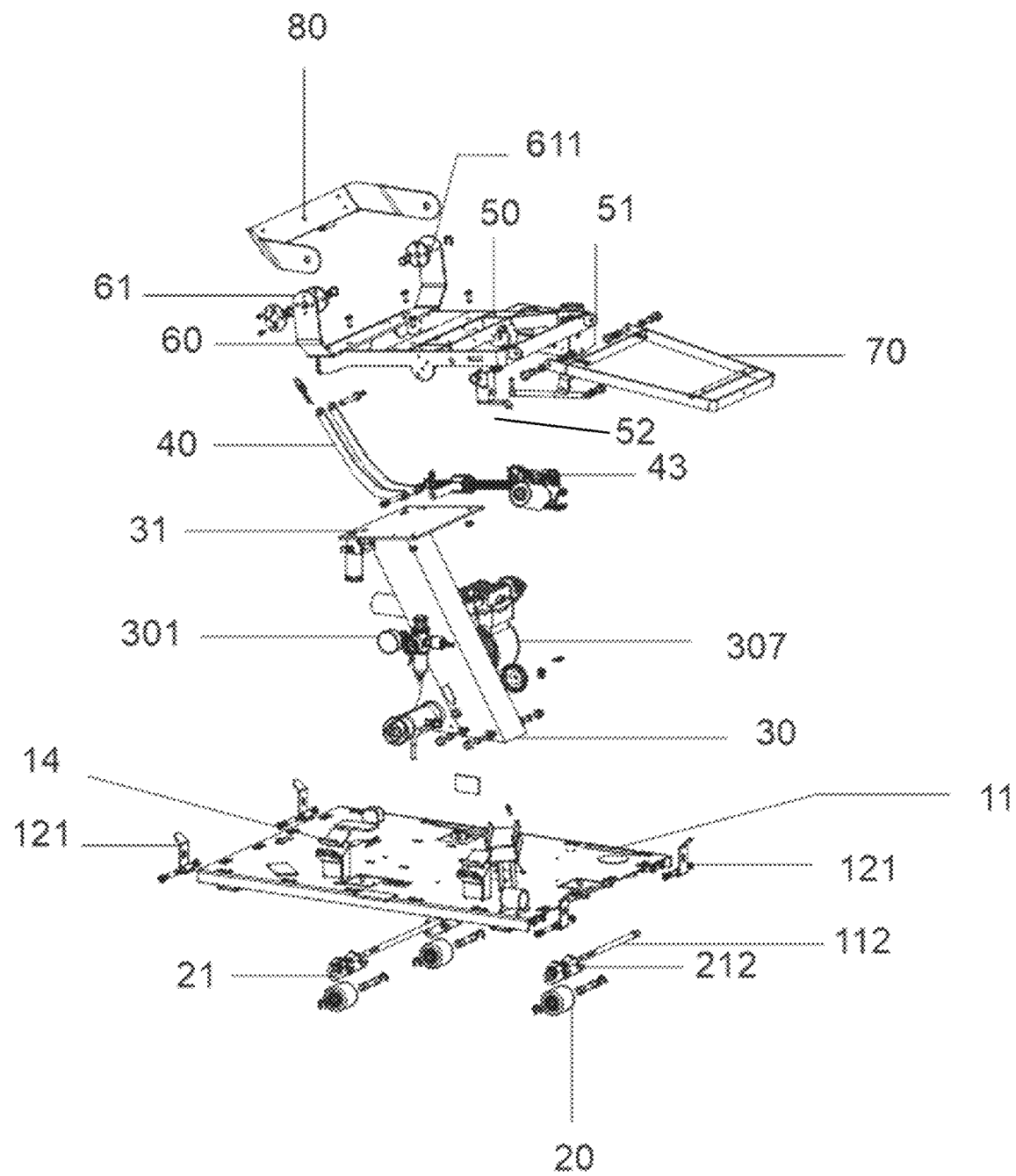
FIG. 3A shows the exploded view of the dental chair support structure.

As presented in FIG. 3A, on the base (11) of the container (10) there are cradles (14) to support the reflector during the containment and transport of the disassembled operating structure.

Figure 3B:
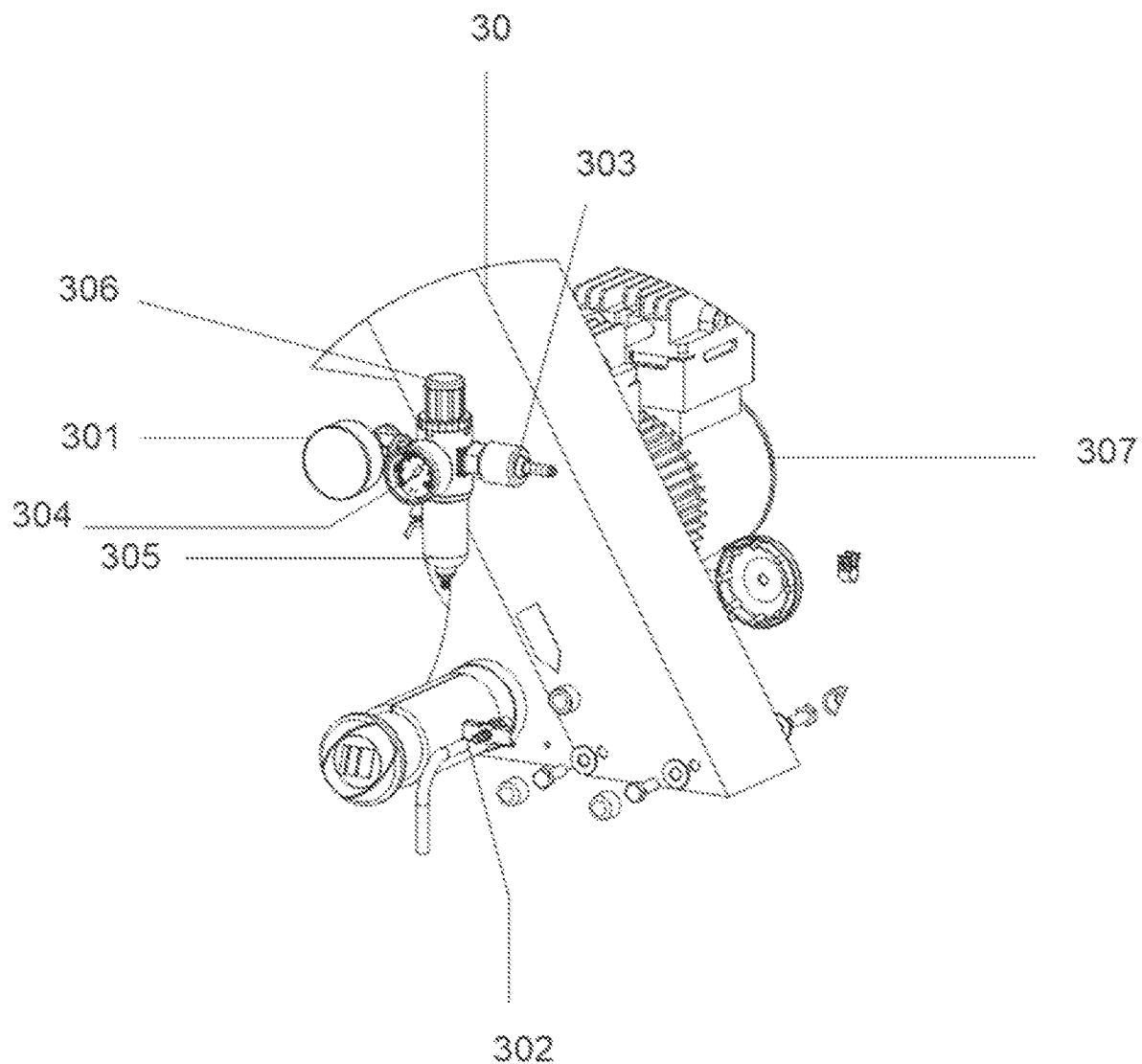
FIG. 3B shows details of the devices for operating and controlling the compressed air tank.

On the base (11) an inclined column (30) is arranged, fixed by screws, said column (30) that supports the structure of the dental chair. As detailed in FIG. 3B, the inclined column (30) works as a compressed air tank, having a manometer (301), drain (302), and safety valve (not shown). At the compressed air outlet (303) for supplying the peripherals, a steam drain with a manometer (304), an automatic drain (305) and valve (306) is installed, which allows adjusting the air flow and interrupting it, by manual adjustment.

A compressor (307) is installed on the base (11) to supply the needs for compressed air of the pneumatic peripherals and suction device. To control the pressure in the tank (30), there is a pressure switch (308).

In the extreme upper portion of the column (30) a plate (31) is arranged, where the structure of the dental chair is fixed by screws, which includes the seat support (S1), the backrest support (S2), the leg rest (S3) and headrest (S4).

The structure of the dental chair includes a first rectangular frame (50) fixed by a plate (31), said first rectangular frame (50) has on its frontal face, a pair of flaps (51).

On this pair of flaps (51), a second rectangular frame (70) is fixed, which supports the leg rest (S3) of the dental chair. The second rectangular frame (70) has flaps (71) coinciding with the flaps (51), said flaps (51) and (71) juxtaposed and held together by an articulation pin (72).

To adjust the inclination of the second rectangular frame (70), a support (52) with a lever (52a) is provided, installed at the first rectangular frame (50). A rod (521) is fixed to the support (52) by a pin (522) tensioned by a spring (523) and the opposite extremity of said rod (521) is fixed to a flap (73) of the second rectangular frame (70) through a pin, as shown on FIG. 3E. As the lever (52a) is moved, the extremity of the rod (521) positioned on the support (52) is moved upwards, with locking happening due to mechanical interference between the rod (521) and the support (52) when said support (52) is tensioned by the spring (523).

Figure 4B:
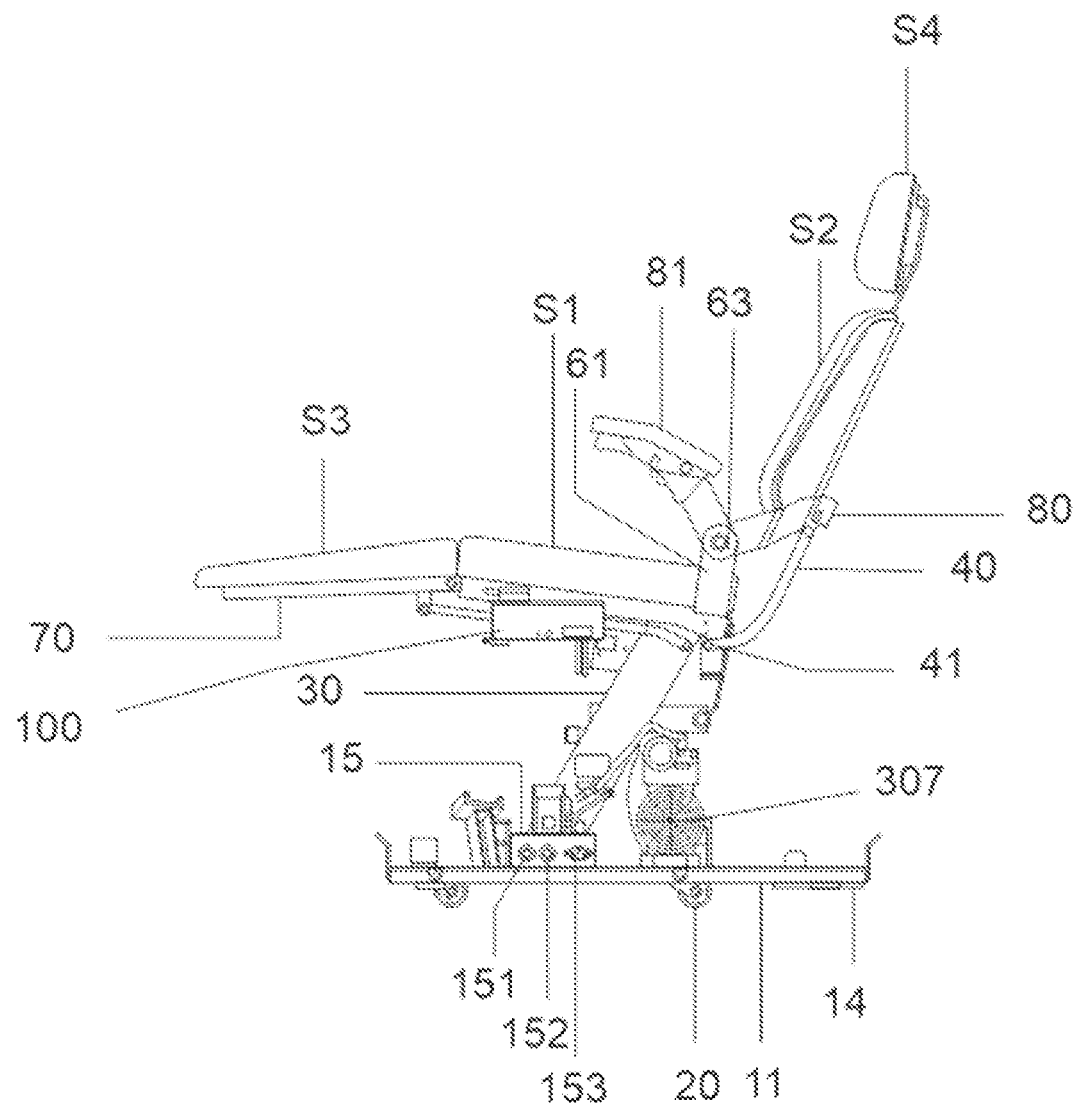

On the rear edge of the first rectangular frame (50) a "U" shaped support (60) with side flaps (61) is fixed by screws, the side flaps (61) being facing upwards and aligned with the side of the rectangular frame (50). In the extreme free portion of the side flaps (61) there is a through hole (611) where an articulation shaft (62) is installed fixed by an elastic ring (631) followed by flanges (63) that associate a backrest support (80), shown on FIG. 3A, and a support for side arms (81) fixed on the flange (63), shown in FIG. 4B.

Figure 3C:
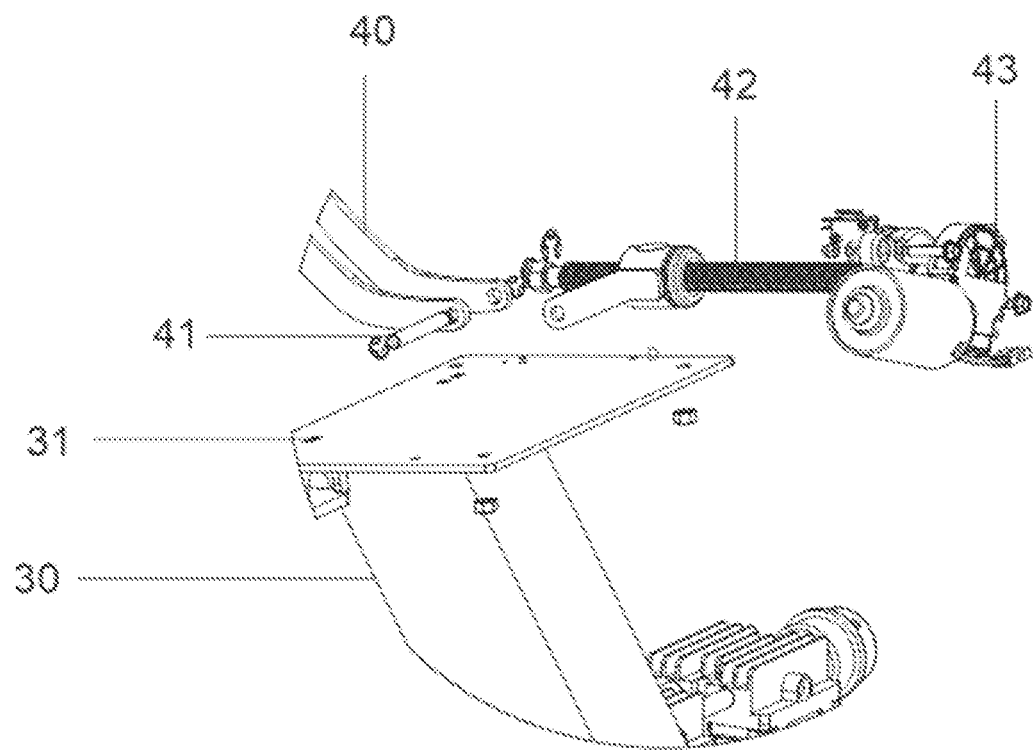
FIG. 3C shows details of the mechanism to move the backrest.
Figure 3D:
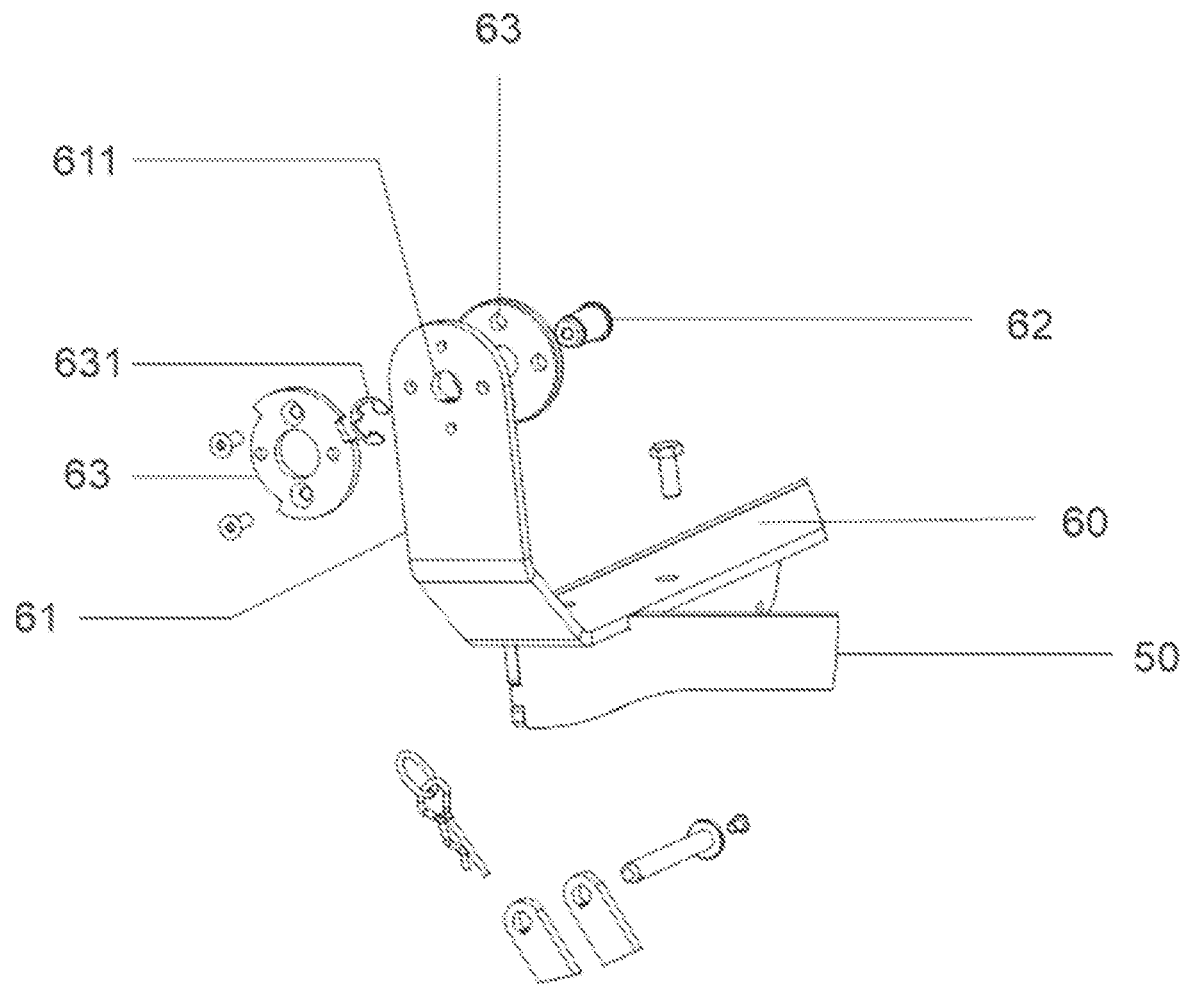
FIG. 3D shows details of the articulation shaft.
Figure 3E:
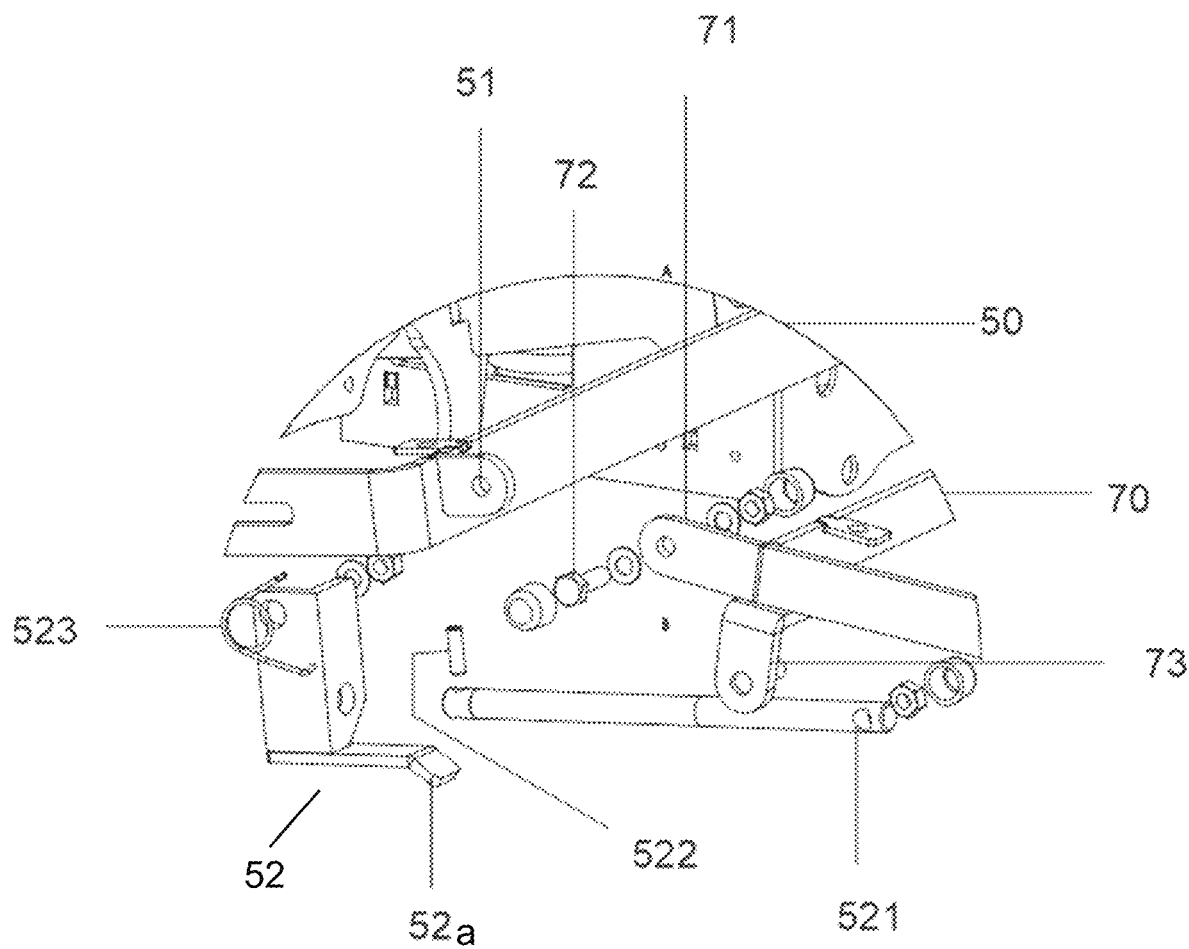
FIG. 3E shows details of the fixation and articulation of the leg rest.

To move the backrest (S2), a movement mechanism is provided comprising a pair of rods (40) connected by a shaft (41) where a spindle (42) driven by a reducer motor (43) is coupled, as detailed on FIG. 3C. At the opposite end to the arrangement of the shaft (41) a fixation means (42) is arranged to the lower edge of the backrest (S2). The backrest (S2) inclination adjustment is done by the spindle (42) in which end-of-course switches are provided, where the rods (40) transfer mechanical movement from the spindle (42) to the backrest (S2) support.

The backrest (S2) is fixed to the support (80) by screws, said backrest (S2) has a telescopic rod (82) on its upper edge, which is responsible for headrest (S4) height adjustment, and at the junction of the shaft at the end of the rod (82) a multi-articulated mechanism (821) is provided for adjustment of the headrest.

Figure 5A:
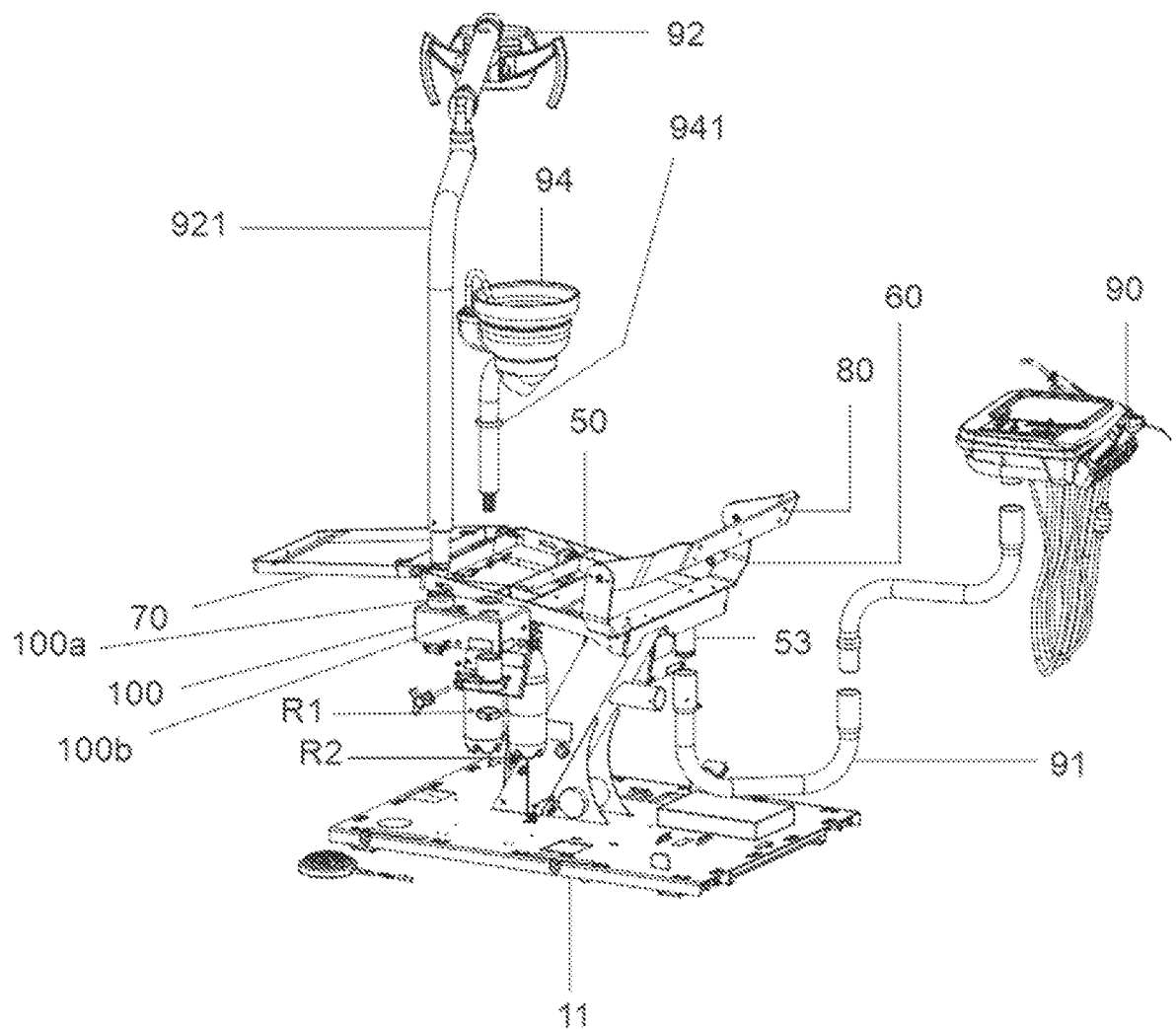
FIG. 5A shows a perspective view of the coupled peripherals.
Figure 5B:
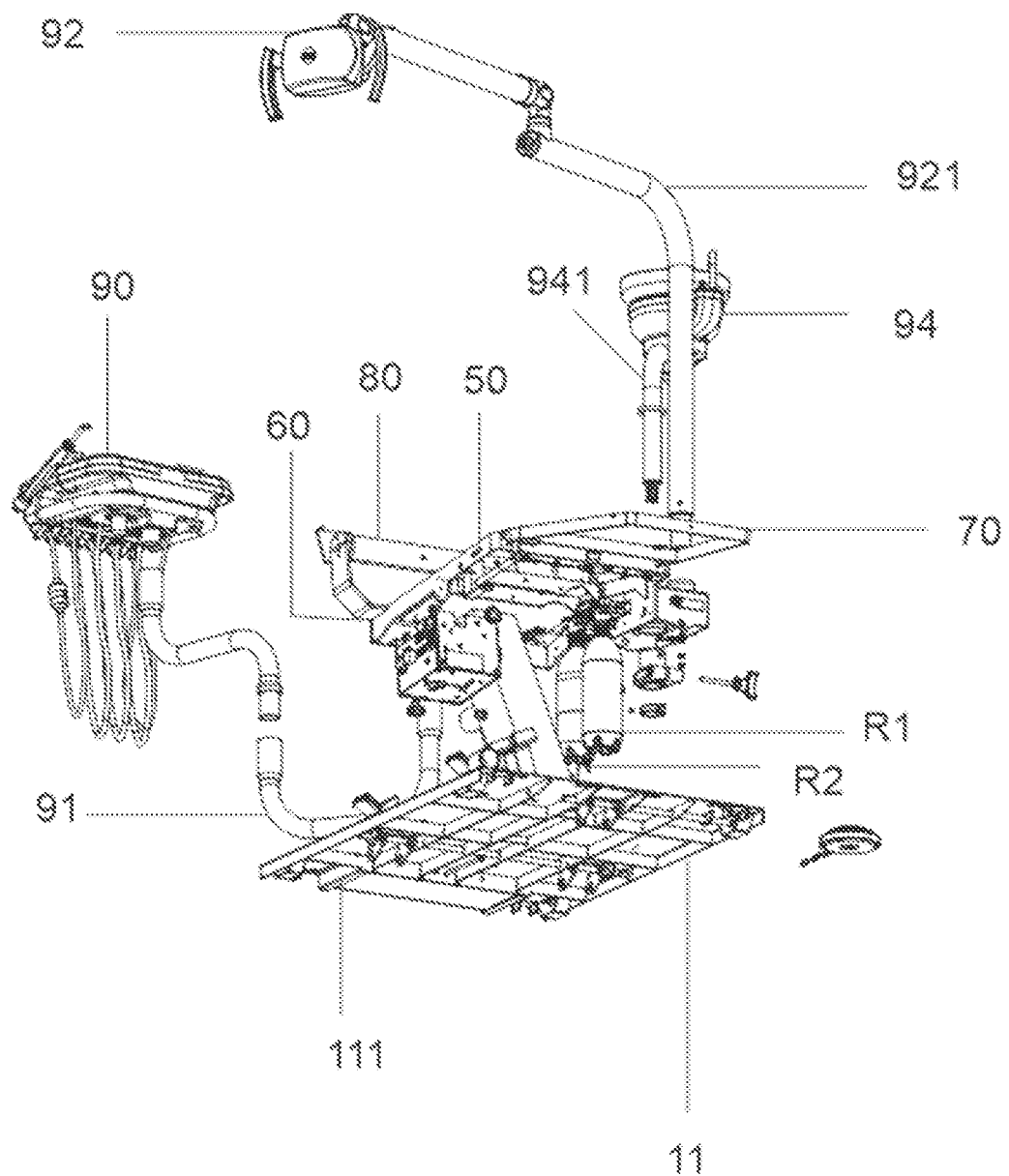
FIG. 5B shows details of the fixation of the table and reflector.
Figure 5C:
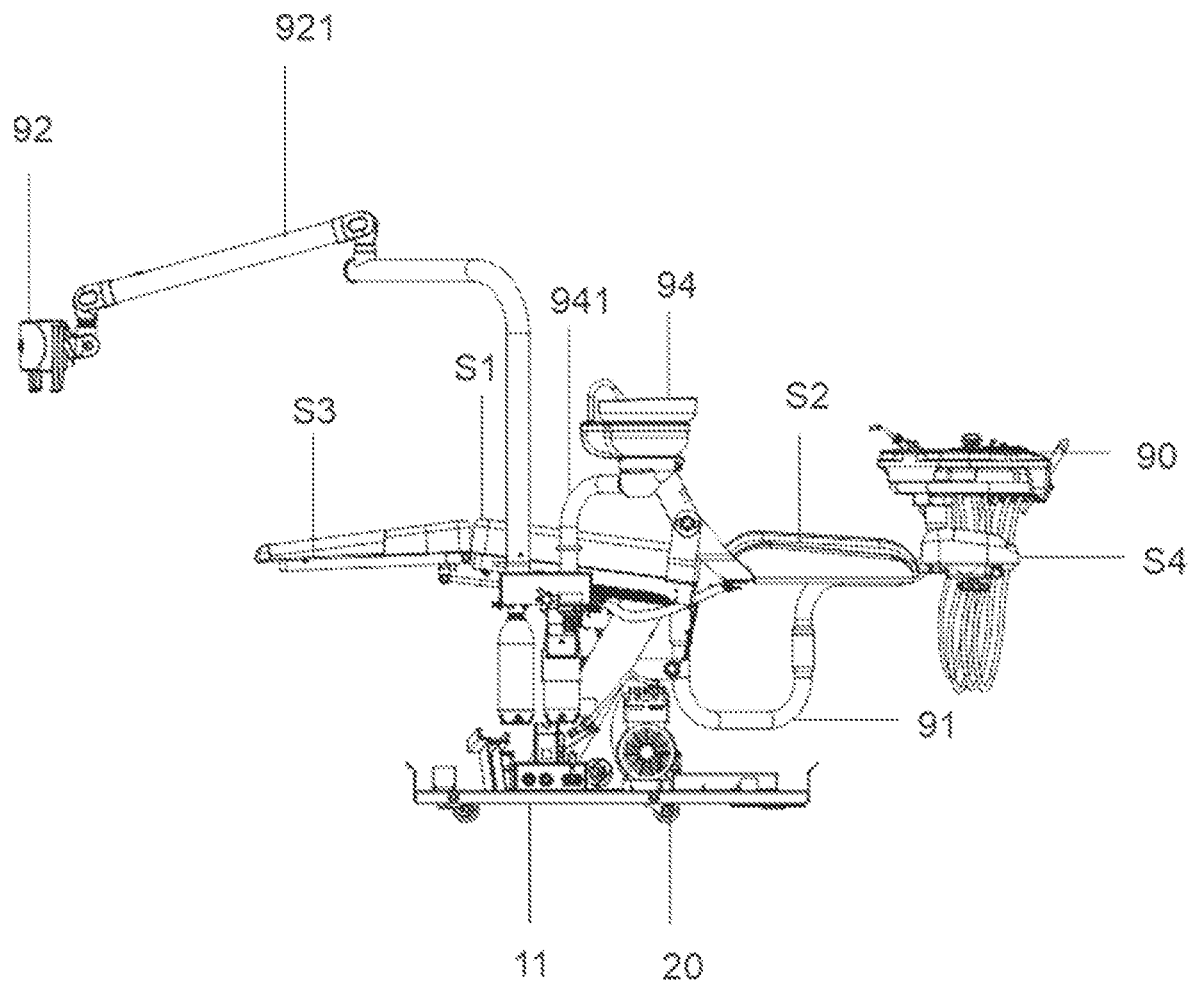
FIG. 5C shows the side view, showing the mounted station.

The instrument table (90) has an arm (91) fixed to the first rectangular frame (50) through coupling to a shaft (53), allowing said arm (91) to move in the surroundings of the dentist chair, as shown in FIG. 5A.

On the side of the first rectangular frame (50) a support structure (100) is arranged supported by a supporting member (not shown). The supporting structure (100) has a pair of fittings (100a) and (100b) where the articulated arm (921) of the reflector (92) and the movable arm (941) of the spittoon (94) are fitted respectively.

Disposal of water from the spittoon (94) is done in a first tank (R1) coupled immediately below said spittoon (94) and water is supplied to the spittoon (94) by a water inlet duct (151) connected to the hydraulic network.

The equipment features a UV light emitting diode (LED UV-C/280 nm) installed at the second tank (R2) where water is stored to be dispensed into the triple syringe, ultrasound and other handparts. The LED reduces the concentration of microorganisms, dismissing the use of chemical products. As it is connected to the equipment, the UV LED turns on for a previously determined period, turning on again in cycles, in order to guarantee the disinfection of the water in the tank (R2).

Fluid that comes out of the tank (R2) is heated and goes through a heating unit where water is heated to a temperature between 37° C. and 47° C. by a source of light powered by a transformer, in order to supply the syringe and the ultrasound with heated water.

Figure 6:
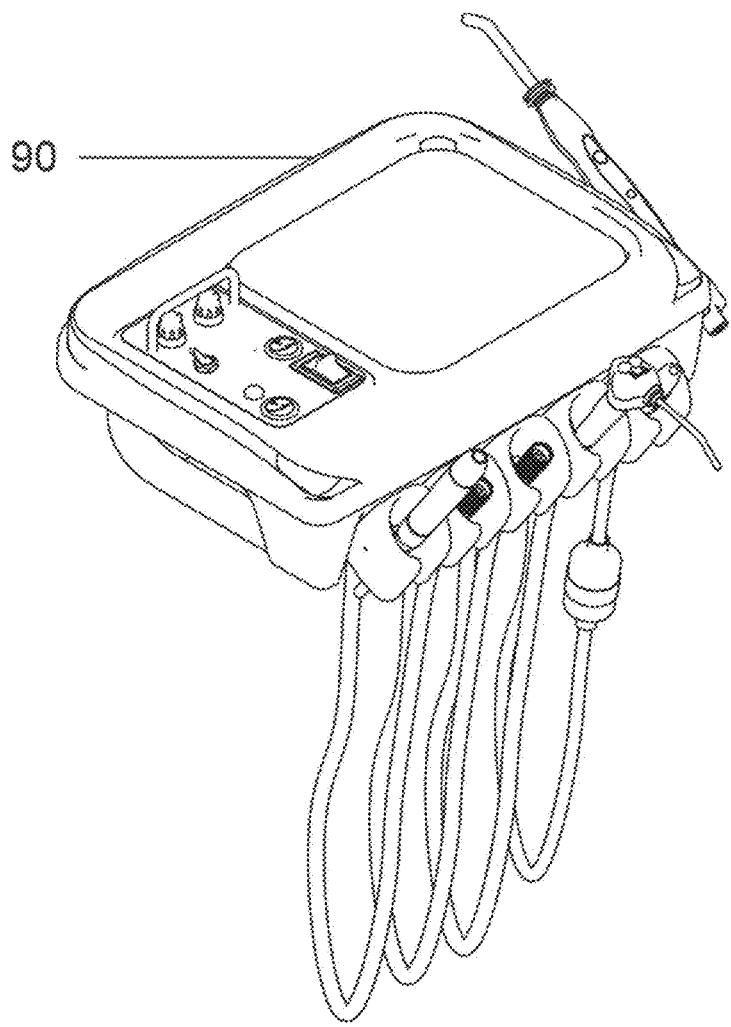
FIG. 6 shows details of the table.

As shown in FIG. 6, the table (90) is composed by a triple syringe, a terminal for coupling a high speed turbine, a terminal for coupling a pneumatic micromotor, a piezoelectric ultrasound, a venturi suction device, a LED curing light, a stainless steel tray to accommodate instruments.

Figure 7:
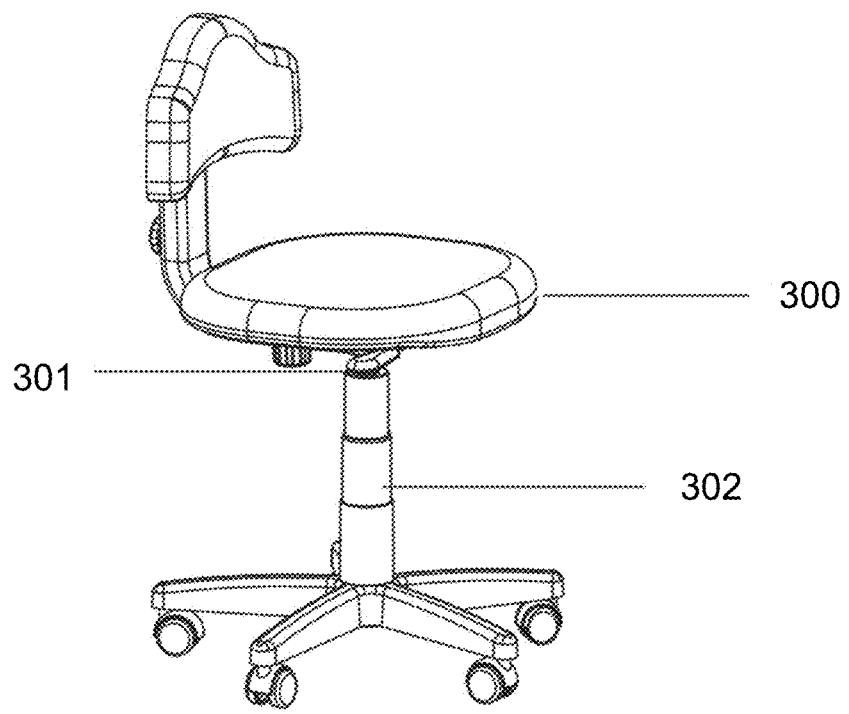
FIG. 7 shows details of the dental stool.

As shown in FIG. 7, a dental stool with a seat (300) fixed by a piston (301) associated to a base with casters (302), whose assembly is facilitated by the coupling of the seat (300) through a handle (not shown) in the piston (301). Disassembly of the dental stool allows its inclusion in the container (10).

The invention claimed is:

1. A transportable autonomous dental module, comprising a prismatic container (10) with a base (11) on which the following are fixed:
   an inclined column (30) fixed by screws, said column (30) has a manometer (301), drain (302), compressed air outlet (303) with a vapor drain with manometer (304), and automatic drain (305), valve (306) and pressure switch (308);
   a plate (31) in the extreme upper portion of the column (30) where a structure of the dental chair is fixed, by screws, which includes the seat support (S1), the backrest (S2), the leg rest (S3) and the headrest (S4), said structure includes a first rectangular frame (50) that has two or more first flaps (51) on its frontal side, where a second rectangular frame (70) that supports a leg rest (S3) is fixed, said second rectangular frame (70) has two or more second flaps (71) that coincide with the two or more first flaps (51), said two or more first flaps (51) and said two or more second flaps (71) are juxtaposed by articulation pin (72);
   an arm (91) to support an instrument table (90), said arm (91) is fixed to the first rectangular frame (50);
   a support structure (100) arranged on a side of the first rectangular frame (50) that has a pair of fittings (100a) and (100b) where, respectively, an articulated arm (921) of a reflector (92) and a movable arm (941) of a spittoon (94) are fitted;
   a first tank (R1) coupled immediately below said spittoon (94);
   a second tank (R2) that stores fluid to be heated.

2. The transportable autonomous dental module, according to claim 1, wherein the container (10) comprises:
   a) a base (11) with girders (111) provided with casters (20) fixed to the base (11) through a support (21) that is fixed to a shaft (112) that extends between the sides of the base (11), said support (21) arranged in a gap of the girders (111) and having a shaft (211) for fixing the caster (20) and at the opposite end, an indentation (212) with diameter equivalent to the shaft (112) in whose end a spring (113) is fixed;
   b) two side faces arranged in opposition (12a) that can be fitted to the base (11) and other two side faces (12b) that have an articulated flap (121) fixed to the girder (111) of the base (11), said flap (121) provided with a through hole that engages in a pin arranged on the surface of said side face (12b).

3. The transportable autonomous dental module, according to claim 2, wherein the base (11) has a first connection for the water inlet duct (151), for a wastewater drain (152) and for a second connection to a source of power (153) and a compressor (307).

4. The transportable autonomous dental module, according to claim 1, wherein the transportable autonomous dental module has a support with a lever (25) installed in the first rectangular frame (50), having a rod (521) fixed to the support (52) by a pin (522) tensioned by a spring (523) and the opposite end of said rod (52) is fixed to a tab (73) of the second rectangular frame (70) through a pin.

5. The transportable autonomous dental module, according to claim 1, wherein the transportable autonomous dental module has, on the back edge of the first rectangular frame (50) a "U" shaped support (60) with two or more side flaps (61) by screwing, with the two or more side flaps (61) facing upwards and aligned with the side of the rectangular frame (50) and in the extreme free portion of the two or more side flaps (61) there is a through hole (611) where an articulation shaft (61) is fixed by an elastic ring (631) fixed by flanges (63) that associate a backrest support (80) and a support for the side arms (81) fixed to the flange (63).

6. The transportable autonomous dental module, according to claim 1, wherein the transportable autonomous dental module has a backrest movement mechanism (S2) that comprises a pair of rods (40) united by a shaft (41).

7. The transportable autonomous dental module, according to claim 1, wherein the backrest (S2) has, at an upper edge, a telescopic rod (82) with a multi-articulated mechanism (821) for an adjustment of the headrest (S4).

8. The transportable autonomous dental module, according to claim 1, wherein the base (11) and container (10) have a drawer (14) that moves on linear guides fixed to the lower face of said base (11).

9. A transportable autonomous dental module comprising:
   (a) a prismatic container (10) with a base (11) with longitudinal members (111) and two opposite side faces (12a) configured to be fitted to the base (11), and the other two side faces (12b) with hinged flaps (121) fixed to the longitudinal members (111) of the base (11), in which each flap of the hinged flaps (121) has a through hole that fits into a pin arranged on the surface of a respective side face (12b), with locking by a clamp (122);
   (b) an inclined column (30) secured to the base (11) by screws, with a plate (31) at its upper end;
   (c) a first rectangular frame (50) attached to the plate (31), featuring tabs (51) on its front face and an axis (53);
   (d) a second rectangular frame (70) with tabs (71) aligned with the tabs (51) of the first rectangular frame (50), joined by a hinge pin (72);
   (e) a support structure (100) located on the side of the first rectangular frame (50), equipped with a pair of fittings (100a) and (100b);

(f) a "U"-shaped support (60) fixed to the rear edge of the first rectangular frame (50) by means of side tabs (61), each containing a through hole (611) through which a hinge axis (62) is installed; and (g) a backrest support (80) and side arm supports (81), both connected to the hinge axis (62) and secured in place by a flange (63).

10. A module as claimed in claim 9, wherein the base (11) includes a terminal (15) equipped with connections for a water inlet duct (151), a wastewater drainage duct (152), and a power supply connection (153); a motor compressor (307) and a pressure switch (308).

11. A module as claimed in claim 9 wherein the first rectangular frame (50) includes a support (52) with a lever (52*a*), and a rod (521) secured to the support (52) by means of pin (522) tensioned by a spring (523), with the opposite end of the rod (521) is fixed to the second rectangular frame (70) via a tab (73).

12. A module as claimed in claim 9, wherein an arm (91) of an instrument support table (90) is coupled to the axis (53) of the first rectangular frame (50).

13. A module as claimed in claim 9, wherein the articulated arm (921) of the reflector (92) and the movable arm (941) of the tank (94) are respectively received in the fittings (100*a*) and (100*b*).

\* \* \* \* \*